Aug. 21, 1973  R. B. BENNETT  3,753,848

INSULATION INSTALLATION

Filed June 23, 1971

INVENTOR.
Robert B. Bennett
BY Robert B. Ingraham
AGENT

United States Patent Office 3,753,848
Patented Aug. 21, 1973

3,753,848
INSULATION INSTALLATION
Robert B. Bennett, Westerville, Ohio, assignor to
The Dow Chemical Company, Midland, Mich.
Filed June 23, 1971, Ser. No. 155,893
Int. Cl. B32b 3/00
U.S. Cl. 161—120    15 Claims

ABSTRACT OF THE DISCLOSURE

Curved surfaces are insulated with slabs, boards or planks of light weight insulating material by providing a plurality of outwardly projecting studs on the surface to be insulated, affixing to the studs a sheet member affixing to the sheet member second studs displaced from the first studs, impaling a plurality of insulating elements on the second studs. A convenient means is provided for installing thermal insulation on regularly or irregularly curved surfaces.

---

Oftentimes it is desired to provide substantial amounts of thermal insualtion on the surface of curved walls such as vessel walls including such structures as spherical tanks, cylindrical tanks, cylindrical tanks having dished heads and the like. Much of the desirable thermal insulation is foamed plastic material such as foamed polyurethane and polystyrene which is available in the form of slabs, billets, planks and other generally sheet-like bodies having two generally opposed and parallel major surfaces and generally parallel ends and sides. Such material is applied to cylindrical surfaces; that is, surfaces of single curvature with relative ease and minimal trimming of the available rectangular structure.

It would be desirable if there were available an improved method for the insulation of single and compound curved surfaces.

It would also be desirable if there were available an improved method for the insulation of curved surfaces employing generally rectangular insulating elements.

It would further be desirable if there were available an improved insulated structure having curved surfaces insulated with generally planar insulating members.

It would also be desirable if there were available an improved method for the preparation of insulated structures suitable for cryogenic application.

It would further be desirable if there were available improved insulated cryogenic structures.

These benefits and other advantages in accordance with the invention are achieved in a method for the insulation of a structure, the structure having a surface to be insulated, the steps of the method comprising affixing to the member to be insulated a plurality of outwardly extending first support members, affixing to the first support members at a location remote from the surface of the member to be insulated a support membrane extending between the outwardly extending first support members, affixing to the support membrane a plurality of second support members outwardly extending away from the member to be insulated, disposing at least one layer of slab-like thermally insulating material generally adjacent the support membrane and remote from the surface of the member to be insulated and retaining said insulating layer generally adjacent the membrane by said second support members.

Also contemplated within the scope of the present invention is an insulated structure, the insulated structure comprising an insulated member, the insulated member having at least one surface, a plurality of first support members affixed to and outwardly extending from said insulated surface, a support membrane disposed upon and supported by the first support members and maintained thereby in spaced relationship from the insulated surface, a second plurality of support members affixed to the support membrane and extending in a direction remote from the insulated surface, at least one layer of insulation disposed on said second support members.

Further features and advantages of the present invention will become more apparent from the following specification taken in connection with the drawing wherein.

Figure 1:
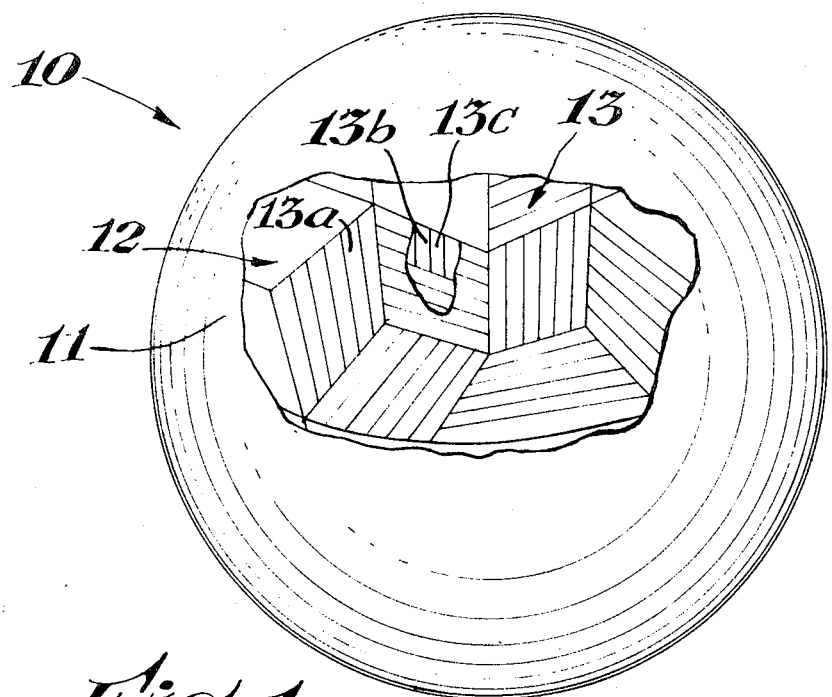
FIG. 1 is a schematically partly cutaway representation of an insulated structure in accordance with the present invention.

In FIG. 1 there is schematically illustrated a partly cutaway view of an insulated structure in accordance with the present invention generally designated by the reference numeral 10. The structure 10 has a spherical, doubly or compound curved outer surface 11 which is a continuous vapor barrier. Beneath the vapor barrier is shown an outer layer of thermal insulation 12. The layer 12 comprises a plurality of elements or tessellations 13 having a generally quadrilateral configuration. The quadrilateral configurations form a generally spherical surface and conform to the spherical surface of the enclosed tank, not shown. Each of the panels 13 comprise a plurality of generally parallel elements 13a secured in generally fixed parallel relationship to each other and disposed in a manner very similar to the planking of the hollow of a pipe. The panels 13 provide a single layer of insulation. Disposed beneath the panels 13 is a second layer of elements 13b each formed in a manner similar to the panels 13. Beneficially, the joints between adjacent panels are disposed in such a manner that they do not coincide with the joints of the outer layer 12, and the joints between elements 13c which form the elements 13b do not fall into register with the joints between the elements 13a. Any desired number of layers of insulating material may be applied in this manner.

Figure 2:
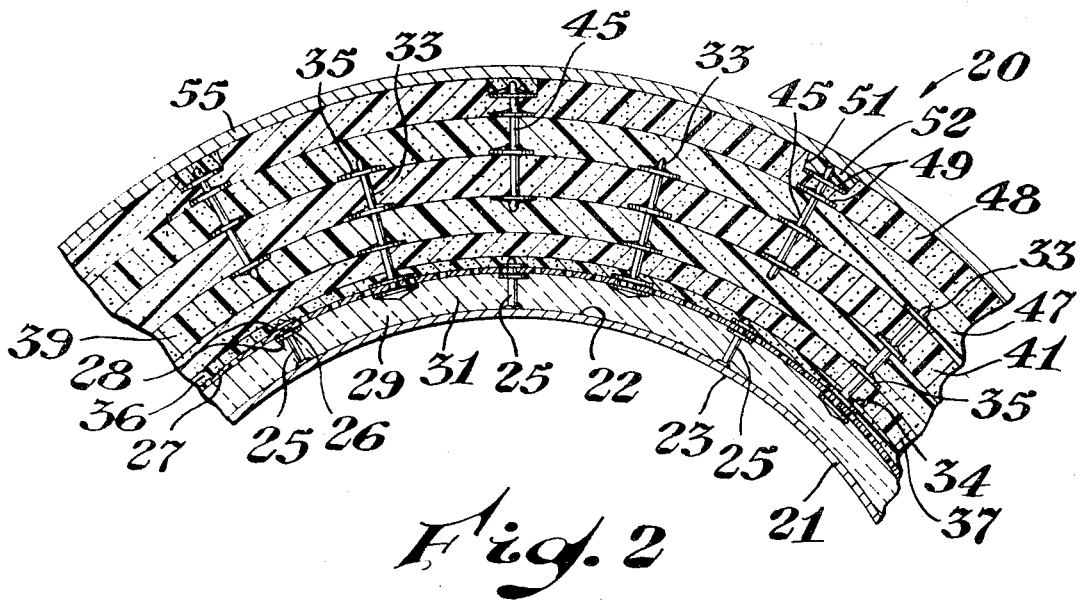
FIG. 2 is a fractional sectional schematic representation of a wall insulated in accordance with the present invention.

In FIG. 2 there is depicted a schematic sectional view of a structure insulated in accordance with the present invention generally designated by the reference numeral 20. The structure 20 comprises a first member or wall to be insulated designated by the reference numeral 21. The wall beneficially is a wall of a spherical tank such as the structure 10 of FIG. 1. The wall 21 has a first or insulated surface 22 and a second or material containing surface 23. A plurality of first support members 25 are affixed to the outer or insulated surface 22 and extend generally normal thereto. Each of the elongate first support members 25 has a remote end 26 disposed remote from the surface 22. A support membrane 27 is in operative engagement with the first support members 25 at a location generally adjacent their outer or remote ends 26. Beneficially, the support membrane 27 is maintained in position by means of retaining means 28. Advantageously, the retaining means 28 is a spring retaining means, spring rings or perforate spring tabs, such spring rings or tabs are available under the trade designation of Pushnut® or Speed Nut®. A space 29 is defined between the surface 22 of the member or wall 21 and the membrane 27. Within the space 29 is disposed a flexible gas permeable insulation 31. A plurality of second generally outwardly extending support members 33 are affixed to and supported by the membrane 27. The support members 33 are disposed generally intermediate the first support members 25 to provide a path of minimal thermal conductivity through the support member 25 to the second support members 33. The retaining means 34 provide generally fixed support of the second support means 33 from the membrane 27. A second compressible vapor permeable insulating layer 36 is disposed over the membrane 27 and is supported by the second support means 33. A third insulating layer 37 composed of individual insulating board-like members is disposed over the first insulating layer 31 and is maintained in position by retaining means 35 which beneficially are spring retaining rings, washers, spot welded to the support means 33 or other similar retainers well known in the art. The second support means 33 also support a fourth insulating layer 39 and a fifth insulating layer 41. The fourth insulating layer 39 and the fifth insulating layer 41 are affixed to the second support means by retaining means 35. The fifth insulating layer 41 has disposed partially therein a third set of support elements 45. The elements 45 extend radially outwardly generally normal to the surface of the fifth layer 41. The elements 45 are disposed remote from the second support elements 33. A sixth insulating layer 47 is disposed over the fifth layer 41 and a seventh layer 48 is disposed over the sixth layer 47. The support means 45 extend through and fasten together the fourth, fifth and sixth layers 41, 47 and 48 by means of the retainers 49 in generally the same manner of the support members 33 and the retainers 35. The retainers 49 in the seventh layer of insulation 48 are disposed within the recesses 51 which optionally are filled with a hardenable foamable material 52. A vapor impermeable membrane 55 is disposed over the seventh layer of insulation and provides a means to prevent moisture access into the insulation lying between the membrane 55 and the wall 21.

In the practice of the present invention, a wide variety of shapes and structures may readily be insulated. If the vessel to be insulated is metallic in nature, one particularly advantageous way to install the first support members such as the support members 25 is by stud welding. If the vessel is of a synthetic resinous material such as a glass fiber reinforced synthetic resin, advantageously the support means may be of a similar material and affixed to the vessel by means of suitable adhesives such as epoxy resins. Although the support members 25 are depicted as rods utilized with metal construction, any desired geometry may be employed such as reinforcing channel sections, channel, I or Z sections. The membrane, that is, the membrane 27, may be expanded metal mesh, woven metal mesh such as hardware cloth, synthetic resinous mesh cloth, perforate fiber board or like member which flexes on cooling of the vessel. Added insulation is obtained when the space such as the space 29 is filled with a compressible insulating material such as an inorganic fiber batt which is readily installed prior to installation of the support membrane. In the event of a leak through the wall 21, the fibrous batt permits movement of vapors or gases within the insulation to a suitable vent, not shown. The remaining layers of insulation such as the layers 36, 37, 39, 41, 47 and 48 beneficially are prepared from cellular foam material such as the synthetic resinous foams; e.g., polystyrene, polyethylene, polypropylene, nylon and the like. The selection of the appropriate foam is dependent upon the installation. However, for most applications an extruded foamed polystyrene is particularly advantageous, being of low density, relatively rigid and yet can be flexed sufficiently to conform to the general outline of vessels, particularly those vessels having one inch thick sections 20 feet in diameter and larger.

Optionally, adhesives and sealants may be used at joints between the elements forming the insulation layers and between adjacent layers. However, for many applications adhesives are not required. The exterior vapor barrier layer such as the layer 55 is of any convenient material. Usually with an insulated vessel its principal purpose is to prevent the entry of moisture vapor into the insulation and therefore prevent a build-up of frost or ice adjacent the vessel wall. Such coatings are well known in the art. Particularly satisfactory non-metallic coatings are glass reinforced epoxy resin compositions which optionally are covered with a metallic sheet. Generally the configuration of the barrier layer will depend on the mechanical abuse to which it is subjected.

The method of the present invention can be readily practiced with a wide variety of forms of insulating material. However, it lends itself particularly well to the insulation of a vessel employing cellular plastic foam in the form of a plank or similar rectangular panels or sheet-like configurations.

Although FIG. 1 depicts a quadrilateral tessellation of a sphere, many other arrangements may also be employed. Some typical patterns are employed in the following U.S. patents, the teachings of which are herewith incorporated by reference: 3,359,694; 3,392,495; 3,462,893; 3,468,082; 3,486,278 and 3,530,620. Thus, the tessellation may be of a geodesic nature using quadrilateral, triangular, pentagonal, hexagonal or other configurations which may be desired.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A method for the thermal insulation of a structure, the structure having a surface to be insulated, the steps of the method comprising
    affixing to the member to be insulated a plurality of outwardly extending first elongate support members,
    affixing to the first support members at a location remote from the location of the member to be insulated a support membrane extending between the outwardly extending first support members,
    affixing to the support membrane a plurality of second support members outwardly extending away from the member to be insulated,
    disposing at least one layer of slab-like thermally insulating material generally adjacent the support membrane and remote from the surface of the member to be insulated, and
    retaining said insulating layer generally adjacent the membrane by said second support members.

2. The method of claim 1 wherein the structure surface to be insulated is generally convex.

3. The method of claim 2 wherein the surface to be insulated is a doubly curved convex surface.

4. The method of claim 1 wherein the slab-like thermally insulating material has the form of a plurality of elongate members.

5. The method of claim 1 wherein a plurality of third support members are disposed within the slab-like thermally insulating material and additional insulating material is supported thereby over previously installed insulating material.

6. The method of claim 1 including the step of applying a vapor barrier to the slab-like insulating material at a location remote from the support membrane.

7. The method of claim 1 including the step of disposing a permeable porous insulating material between the support membrane and the surface to be insulated.

8. A thermally insulated structure, the insulated structure comprising
    an insulated member, the insulated member having:
        at least one surface,
        a plurality of first elongate support members affixed to and outwardly extending from said insulated surface,
    a support membrane disposed upon and supported by the first support members and maintained thereby in spaced relationship from the insulated surface, a second plurality of support members affixed to the support membrane, extending in a direction remote from the insulated surface,
at least one layer of generally slab-like insulation disposed on said second support members.

9. The structure of claim 8 wherein the insulated surface is generally convex.

10. The structure of claim 8 wherein the insulated surface is a convex, doubly curved surface.

11. The structure of claim 8 having a second layer of insulation disposed thereon remote from the support membrane and supported by a plurality of third supporting members in engagement with the first and second layers of insulating material.

12. The structure of claim 8 including a vapor barrier layer disposed generally adjacent the insulation layer and remote from the supporting membrane.

13. The structure of claim 8 wherein the structure has a generally spherical configuration.

14. The structure of claim 8 wherein the slab-like insulation is a synthetic resinous thermoplastic closed cell foam.

15. The structure of claim 14 wherein the synthetic resinous thermoplastic foam is in the form of a plurality of elongate members disposed in a tessellated pattern.

References Cited
UNITED STATES PATENTS

| 3,591,443 | 7/1971 | Cox | 161—160 |
| 3,607,595 | 9/1971 | Windecker | 161—190 |

WILLIAM J. VAN BALEN, Primary Examiner

U.S. Cl. X.R.

156—71; 161—69, 121, 161, 190; 220—9 F, 9 LG